(12) United States Patent

Long

(10) Patent No.: US 12,602,693 B2

(45) Date of Patent: Apr. 14, 2026

(54) FRAUD DETECTION USING BYTE PAIR ENCODING

(71) Applicant: THE HUNTINGTON NATIONAL BANK, Columbus, OH (US)

(72) Inventor: Brian Long, Athens, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 18/759,324

(22) Filed: Jun. 28, 2024

(65) Prior Publication Data

US 2026/0004301 A1 Jan. 1, 2026

(51) Int. Cl.
G06Q 20/40 (2012.01)
G06F 40/284 (2020.01)
H04L 9/40 (2022.01)

(52) U.S. Cl.
CPC ....... G06Q 20/4016 (2013.01); G06F 40/284 (2020.01)

(58) Field of Classification Search
None
See application file for complete search history.

(56) References Cited

U.S. PATENT DOCUMENTS

| | | | | |
|---|---|---|---|---|
| 6,670,897 B1 * | 12/2003 | Lin | ..................... | H03M 7/3084 341/65 |
| 2008/0275814 A1 * | 11/2008 | Milana | ................... | G06Q 30/02 705/39 |
| 2012/0056763 A1 * | 3/2012 | Motta | ..................... | H03M 7/40 341/87 |
| 2018/0268080 A1 * | 9/2018 | Christian | ................ | G06F 17/18 |
| 2023/0273981 A1 * | 8/2023 | Rapowitz | ............ | G06F 21/6245 726/4 |

* cited by examiner

*Primary Examiner* — Bennett M Sigmond
*Assistant Examiner* — Bhavin D Shah
(74) *Attorney, Agent, or Firm* — Kilpatrick Townsend & Stockton LLP

(57) ABSTRACT

Techniques are described herein for fraud detection which may include generating, from legitimate account data instances, a data compression vocabulary. The data compression vocabulary may specify one or more tokens identified from the legitimate account data instances and a corresponding replacement value. A new instance of account data may be received. Compressed account data may be generated based at least in part on replacing a token identified in the account data with a respective replacement value identified for the token in the data compression vocabulary. Any amount by which the new account data was compressed may be computed and used to make a determination as to whether the new instance of account data is fraudulent or legitimate.

20 Claims, 6 Drawing Sheets

Figure 1:
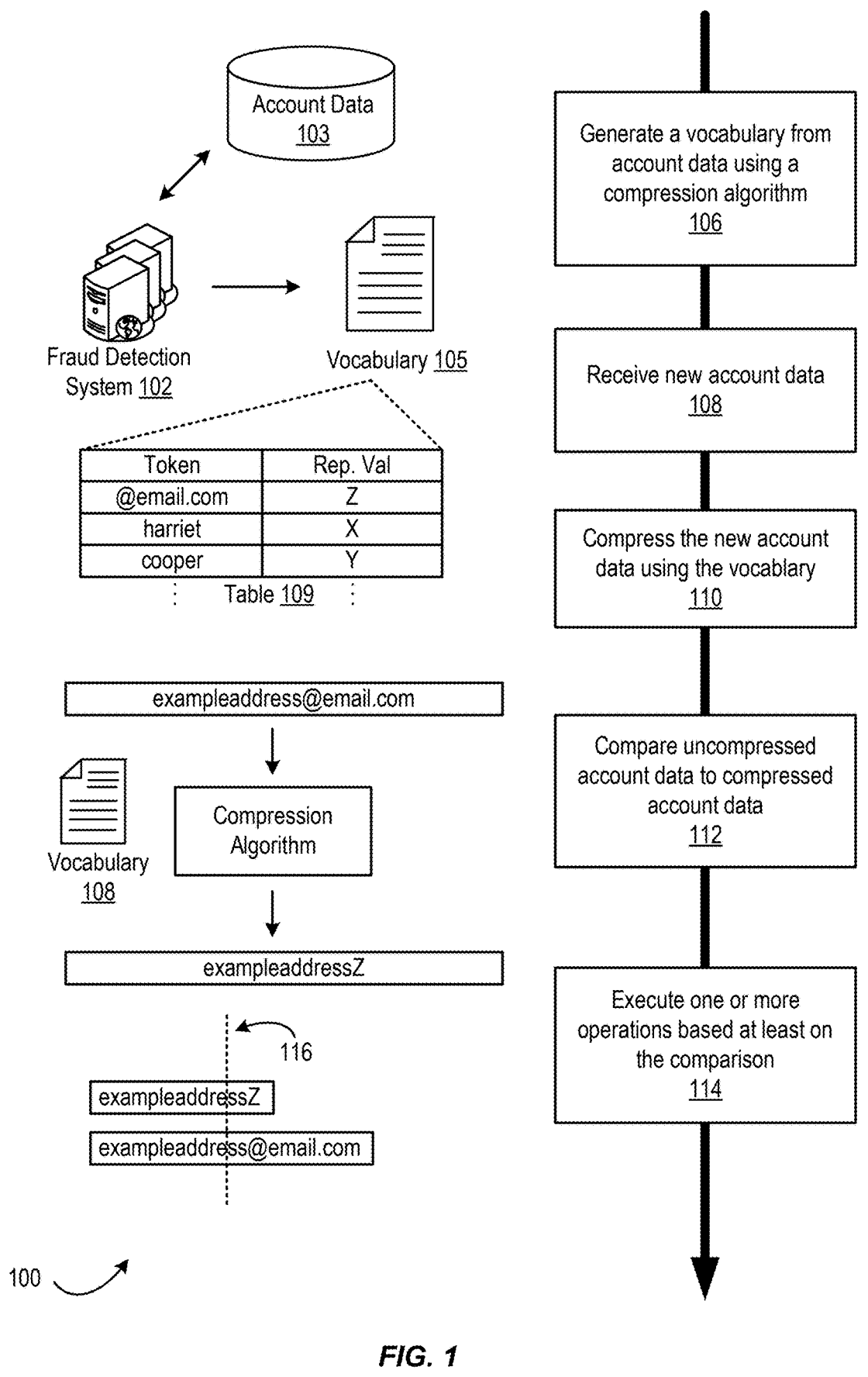

Account Data
103

Fraud Detection
System 102

Vocabulary 105

| Token | Rep. Val |
|-------|----------|
| @email.com | Z |
| harriet | X |
| cooper | Y |

Table 109 exampleaddress@email.com

Vocabulary
108

Compression
Algorithm exampleaddressZ

116 exampleaddressZ exampleaddress@email.com

100

Generate a vocabulary from
account data using a
compression algorithm
106

Receive new account data
108

Compress the new account
data using the vocablary
110

Compare uncompressed
account data to compressed
account data
112

Execute one or more
operations based at least on
the comparison
114

| | |
|---|---|
| exampleaddress@email.com | |
| harrietmadison@email.com | |
| example@otheremail.com | |
| harrietroberts@email.com | |
| cooper@exampleemail.com | |
| cooperrobinson@email.com | |
| bradleyrobbins@email.com | |
| examplename@exampleemail.com | |

...

206

| Token | Frequency |
|---|---|
| @email.com | 5 |
| example | 5 |
| rob | 3 |
| harriet | 2 |
| cooper | 2 |
| son | 2 |
| ... | ... |

202

| Token | Replacement Value |
|---|---|
| @email.com | Z |
| example | Y |
| rob | X |
| harriet | W |
| cooper | U |
| son | T |
| ... | ... |

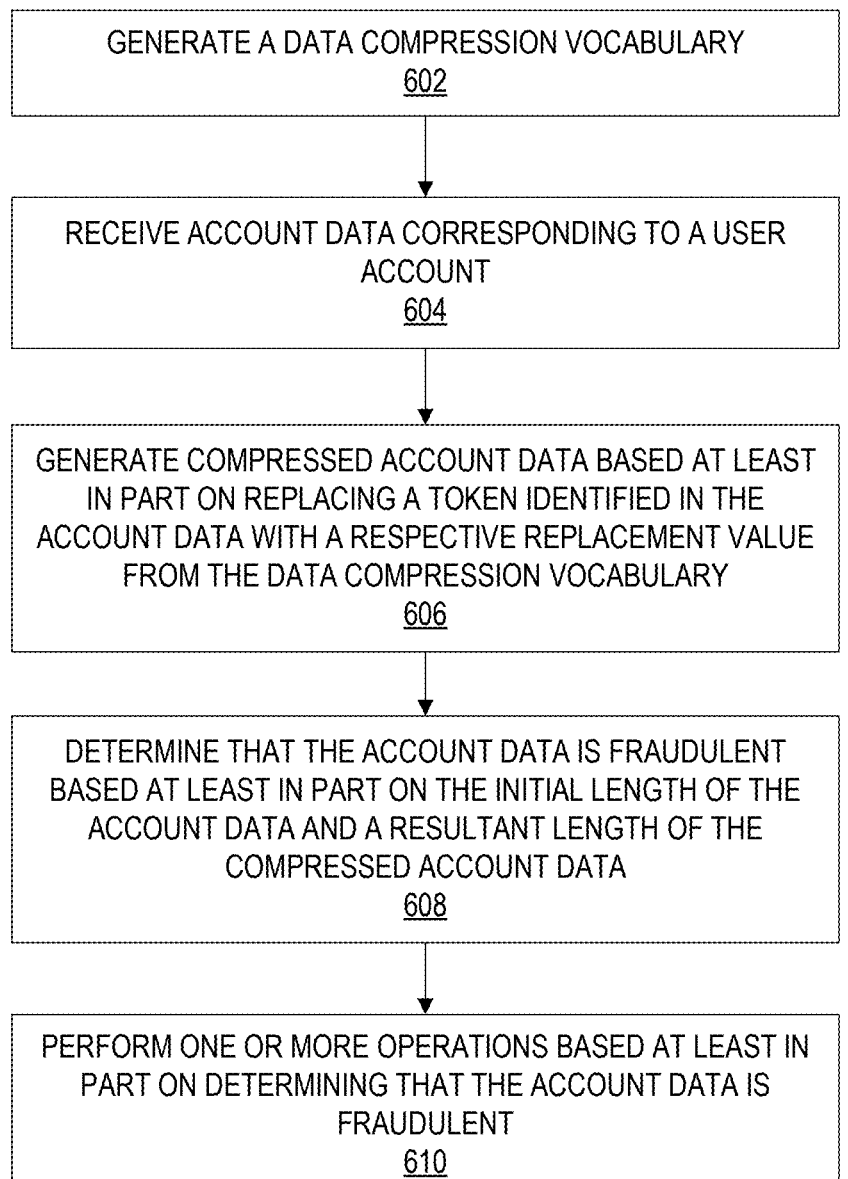

GENERATE A DATA COMPRESSION VOCABULARY
602

RECEIVE ACCOUNT DATA CORRESPONDING TO A USER
ACCOUNT
604

GENERATE COMPRESSED ACCOUNT DATA BASED AT LEAST
IN PART ON REPLACING A TOKEN IDENTIFIED IN THE
ACCOUNT DATA WITH A RESPECTIVE REPLACEMENT VALUE
FROM THE DATA COMPRESSION VOCABULARY
606

DETERMINE THAT THE ACCOUNT DATA IS FRAUDULENT
BASED AT LEAST IN PART ON THE INITIAL LENGTH OF THE
ACCOUNT DATA AND A RESULTANT LENGTH OF THE
COMPRESSED ACCOUNT DATA
608

PERFORM ONE OR MORE OPERATIONS BASED AT LEAST IN
PART ON DETERMINING THAT THE ACCOUNT DATA IS
FRAUDULENT
610

FRAUD DETECTION USING BYTE PAIR ENCODING

BACKGROUND

Bank fraud has typically involved using illegal means to obtain money, property, financial assets, or similar. In some situations, fraud can involve falsified or otherwise illicit account data. In a computer-based electronic network for managing accounts associated with an entity (e.g., an online retailer, a financial institution, etc.), fraudulent accounts may be created to gain information, assets, or otherwise disguise an illicit intent. Additionally, artificial intelligence (AI) bots, which have become more prevalent as advances in AI technology has increased over the past few years, have been used by fraudsters to create accounts for similar purposes. Consequently, due to the large volume of fraudulent accounts being created, detecting fraudulent activity can be a time consuming, data intensive, and complex.

BRIEF SUMMARY OF THE INVENTION

Techniques are provided for detecting fraudulent requests using byte pair encoding. Various embodiments are described herein, including methods, systems, non-transitory computer-readable storage media storing programs, code, or instructions executable by one or more processors, and the like.

One embodiment is directed to a computer-implemented method for detecting fraudulent account data. The method may comprise generating, by a computing device from legitimate account data instances, a data compression vocabulary. In some embodiments, the data compression vocabulary specifies a plurality of tokens identified from the legitimate account data instances. In some embodiments, the plurality of tokens are individually associated with a corresponding replacement value. The method may include receiving, by the computing device, account data corresponding to a user account, the account data having an initial length. The method may include generating, by the computing device, compressed account data based at least in part on replacing a token identified in the account data with a respective replacement value from the data compression vocabulary. The method may include computing, by the computing device, a relative length of the compressed account data based at least in part on the initial length of the account data. The method may include determining, by the computing device, that the account data is fraudulent based at least in part on the relative length of the compressed account data. The method may include performing, by the computing device, one or more operations based at least in part on determining that the account data is fraudulent.

In some embodiments, determining that the account data is fraudulent is based at least in part on the relative length of the compressed account data and may comprise determining that the relative length exceeds a threshold value.

In some embodiments, generating the data compression vocabulary utilizes a byte pair encoding algorithm.

In some embodiments, the account data comprises an email address.

In some embodiments, the legitimate account data instances are obtained from historical account data of a plurality of accounts that have been identified as being legitimate.

In some embodiments, the account data is received as part of a request to open the user account.

In some embodiments, the one or more operations comprise denying the request to open the user account.

In some embodiments, a fraud detection system comprises one or more processors and one or more memories storing computer-executable instructions that, when executed by the one or more processors, causes the one or more processors to perform the method(s) disclosed herein.

In some embodiments, a non-transitory computer-readable storage medium storing computer-executable instructions that, when executed with one or more processors of a computing device, causes the computing device to perform the method(s) disclosed herein.

BRIEF DESCRIPTION OF THE DRAWINGS

Various embodiments in accordance with the present disclosure will be described with reference to the drawings, in which:

FIG. 1 is an example flow for detecting fraudulent account data, in accordance with at least one embodiment;

FIG. 2 is an example block diagram illustrating techniques for generating a vocabulary using byte pair encoding techniques, in accordance with at least one embodiment;

FIG. 6 is a block diagram illustrating an example method for detecting fraudulent account data, in accordance with at least one embodiment.

DETAILED DESCRIPTION

Figure 3:
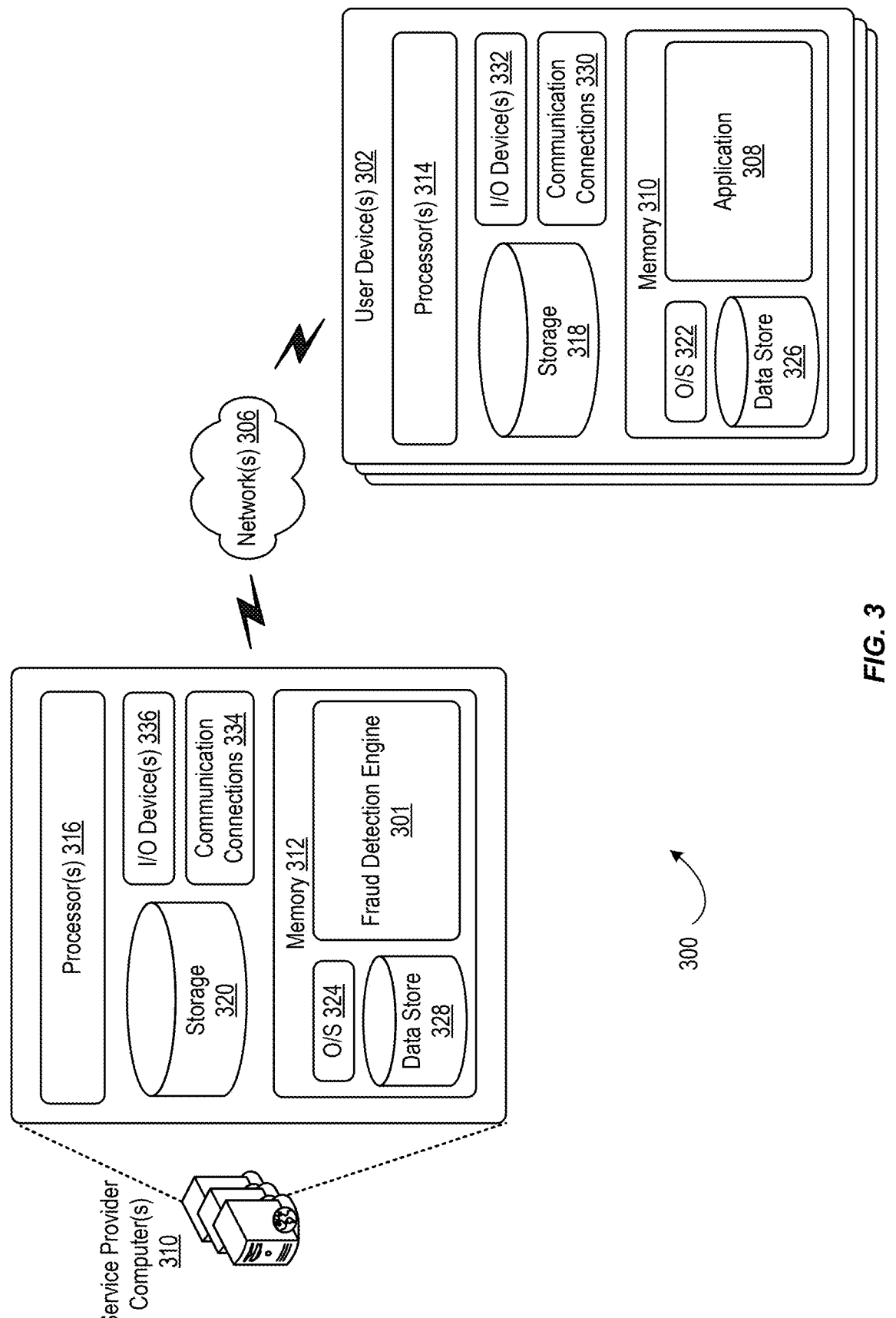
FIG. 3 is a block diagram illustrating an example system including a fraud detection engine, in accordance with at least one embodiment.

In the following description, various embodiments will be described. For purposes of explanation, specific configurations and details are set forth in order to provide a thorough understanding of the embodiments. However, it will be apparent to one skilled in the art that the embodiments may be practiced without the specific details. Furthermore, well-known features may be omitted or simplified in order not to obscure the embodiment being described.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Techniques are provided for detecting fraudulent requests using byte pair encoding. Identifying fraud as early as possible is any industry is highly desirable. Many industries rely solely on computer networked infrastructure function correctly and participate in commerce. Providing solid security measures to protect the computer networked infrastructure is paramount to ensuring data security. Security measures often involve firewalls to mitigate distributed denial-of-service "DDOS" attacks or may involve two-factor authentication such as by short-message-service "SMS" texts on an individual's smartphone. Some security measures often involve biometrics such as a fingerprint. The level of security measures often depends on what is being guarded, and more importantly, why it is being guarded. For example, banking industries implement several security features for account holders like personal identification "PIN" codes, voice authentication, passphrases, or personal historical events like when an individual adopted their first dog, to protect the account holders assets. These features each provide some level of fraud detection by linking a personal security feature to an individual. However, none of these security features provide active vanguard protection from fraudulent activity prior to getting an approved account.

The banking industry is just one of many industries suspectable to fraudulent account creation. Other industries include information technology, subscription services, streaming services, entertainment industries, gaming industries, online retail industries, and the like, each of which are billion dollar industries that must continually battle against various forms of fraud. Many of these industries must rely on after-the-fact countermeasures of varying degrees from inactive account purging to law enforcement involvement and investigations. This is less than ideal as time and resources are expended to correct the situation after the damage has already occurred. Therefore, there is a need for an improved, simple, and effective protection technique that detects fraud prior earlier on.

It has become commonplace for individuals to open accounts online. The banking industry is not alone in offering online account creation. For example, many gym memberships, streaming services, and even grocery stores offer online account creation. Any industry that offers online account creation is vulnerable to fraudulent account creation and may benefit from a techniques which mitigate, and in some cases, eliminate, fraudulent account creation.

The disclosed techniques disclosed herein provide improvements to fraud detection by enabling fraudulent activity to be detected at the onset of account creation. When an individual begins the process of signing up for a new account, the individual typically enters information such as an email address, login credentials, a phone number, a physical address, or the like. Most account providers (e.g., financial institutions, online retailers, streaming services, etc.) have a corpus of accounts which are already known to be valid. Each of these existing accounts may have a compression algorithm (e.g., byte pair encoding) applied to any suitable portion of the account data (e.g., the email address associated with the account) to create a lexicon, or vocabulary in which commonly occurring strings of one or more consecutive bytes of data are identified within a dataset and associated with a one or more replacement bytes that do not occur in the dataset and which include a fewer number of bytes than the original string. This vocabulary can be used at any suitable time for data compression by replacing the commonly occurring strings with the shorter byte(s) with which they are associated in the vocabulary. When a new account is requested, the account data (in this example, the email address) may be compressed using the vocabulary built from legitimate account data. It has been observed that legitimate account data is more likely to include a greater number of commonly used strings than fraudulent account data. Therefore, the more compressed the original account data becomes, the higher the likelihood that the account data is legitimate. The comparison between the length of the compressed account data and the length of the uncompressed account data. When the resultant value breaches a predefined compression threshold value, the account data may be deemed legitimate. When the resultant value fails to breach the predefined compression threshold value, the account data may be deemed fraudulent.

The disclosed techniques disclosed herein provide several advantages such as preventing individuals with fraudulent intent from gaining access to sensitive information, databases, memberships, and similar vulnerable systems. In some cases, automatically denying and/or freezing new accounts reduces the time that system administrators need to spend monitoring those systems. The disclosed techniques minimize the risk of wasteful data processing by providing an extra layer of protection against fraudulent account creation such as by AI bots and by reducing the risk of any number of attacks (e.g., DDOS attacks and the like) that could have been instigated against the system if the fraudulent account creation had succeeded. The techniques disclosed herein minimize costs and reduce, or even eliminate, the use of processing resources previously needed to sift through previously-created accounts to determine whether the accounts are legitimate, as well as after-the-fact costs and privacy concerns related to data breaches which may have resulted from the fraudulent account. In addition, techniques described herein provide reduced data storage requirements by relieving account providers from having to store fraudulent account data. Moreover, techniques described herein provide institutions an accurate filtering process to ensure that accounts for a specific institution are legitimate which is useful for providing accurate membership numbers to investors.

Moving on to FIG. 1 which illustrates an example flow 100 for detecting fraudulent account data, in accordance with at least one embodiment. The operations discussed in connection with FIG. 1 may be performed with a Fraud Detection System 102 (hereinafter "FDS 102"). In some embodiments, FDS 102 may be implemented by one or more computer(s), as a service, within an application, or the like. The operations discussed in connection with FIG. 1 may be performed in any suitable order. More or fewer operations than those depicted in FIG. 1 may be employed without diverting from this disclosure.

The flow 100 may begin at block 106 where the FDS 102 may generate a data compression vocabulary (e.g., vocabulary 105) from account data 103 using a data compression algorithm (e.g., a byte pairing encoding algorithm or similar). In some embodiments, if the vocabulary 105 has already been generated, it may be retrieved from a data store (e.g., vocabulary data 440 of FIG. 4). The account data 103 may include any suitable number of account data instances corresponding to accounts that have already been deemed legitimate. Each account data instance of the account data 103 may include one or more email addresses, one or more physical addresses, one or more phone numbers, a first name, a last name, or the like, or any suitable combination thereof. The vocabulary 105 may be generated using a data compression algorithm. As a non-limiting example, a byte pair encoding algorithm may be used to identify commonly occurring strings of two or more consecutive bytes from the account data 103 and individually assign those strings a shorter string (e.g., one or more bytes) that does not occur in account data 103. A method for generating the vocabulary is discussed in more detail with respect to FIG. 2, and is not repeated here, for brevity. The FDS 102 may obtain account data 103 and generate vocabulary 105 at any suitable time, according to any suitable periodicity or schedule, or by user request.

In some embodiments, the data compression vocabulary 105 may maintain associations between any suitable number of commonly occurring strings (herein referred to as "tokens") and their respective replacement values. These associations may be maintained in any suitable manner such as using a mapping, a table, an object, a key/value pair, or the like. As a non-limiting example, table 109 is depicted as maintaining associations between a number of tokens and their respective replacement values.

At block 108, the flow 100 may continue when account data is received from a new account (e.g., an account which does not exist in account data 103). In some embodiments, the new account data may be received as part of an online account creation process (e.g., in an account creation request) or otherwise prior to an account being created. By way of a non-limiting example, the account data may include account information such as an email address, a first name, a last name, or the like.

In some embodiments, the flow 100 may continue at block 110 where the FDS 102 may compress the new account data using the vocabulary 105 generated at 106. By way of example, the provided email address may be compressed by matching tokens of the email address to tokens of the vocabulary 105 and replacing the matched tokens in the email address with the replacement values the vocabulary 105 identifies as corresponding to those tokens.

In some embodiments, the flow 100 may continue at block 112 where the FDS 102 may compare the length of the compressed account data to the length of the account data before compression to determine a relative length of the compressed account data. In some examples, if the relative length of the compressed account data exceeds a threshold value (e.g., the length of the compressed account data is greater than 50% of the length of the uncompressed account data), the account data may be identified as being fraudulent.

In some embodiments, the flow 100 may continue at block 114 where the FDS 102 may execute one or more operations (e.g., using data processing module 410 of FIG. 4) based on the comparison performed at block 112. By way of example, in instances where the comparison performed at 114 indicates that the compression of the account has breached a predefined threshold value (e.g., 50% compression, indicating that the compressed account data is half the length or less of the uncompressed account data, 66% compression, indicating that the compressed account data is a third or less of the length of the uncompressed account data, etc.), the FDS 102 may perform one or more operations such as, but not limited to, approving a request to open a new account, performing operations for creating a new account, storing the new account data in a data store (e.g., account data 430 of FIG. 4), storing the vocabulary for the new account in a data store, or the like. Alternatively, in instances in which the comparison performed at 114 indicates that the compression of the account data has failed to breach the predefined threshold value, the FDS 102 may perform one or more operations including, but not limited to, denying a request to open the user account (e.g., the new account), notifying a relevant party (e.g., user, system administrator, or similar) that the new account may be fraudulent, storing the new account in a data store. As an example, the threshold value depicted at 116 may correspond to a threshold value that indicates at least 50% data compression is desired. Said another way, compressed data that at least half of the length of the uncompressed data may be deemed legitimate, while compressed data that is greater than half of the length of the uncompressed data may be deemed fraudulent. As can be seen in FIG. 1, FIG. 2 is an example block diagram 200 illustrating techniques for generating a vocabulary 202 (e.g., the vocabulary 105 of FIG. 1) using byte pair encoding techniques, in accordance with at least one embodiment. By way of example, a byte pair encoding algorithm may be applied to account data 204 to ultimately generate vocabulary 202. Account data 202 may include any suitable portion of any suitable number of instances of account data (e.g., phone numbers, email addresses, physical addresses, first names, last names, etc.).

To generate vocabulary 202, the byte pair encoding algorithm may include determining a frequency (e.g., a count) of how many times a token occurs in account data 204.

A byte pair encoding algorithm may start with counting how many times a token including a single alphanumeric character (e.g., "a", "b", "3", "@", etc.) occurs in account data 204. The most frequently occurring token may be selected ("e") and the most commonly occurring token that consecutively occurs after the most frequently occurring character ("s") may be identified based on another round of counting. These tokens may be merged to form a new token ("es") and the number of times the merged token occurs in the account data may be maintained (e.g., via table 206). This process may be iteratively performed any suitable number of times to identify the most commonly used tokens (e.g., tokens of potentially varying lengths) within the data set. Table 206 depicts some sample tokens identified from account data 204 and the frequency that each token occurs in the account data 204. Once identified, each token may be replaced with a token (e.g., one or more bytes) that does not occur in the account data 204, resulting in vocabulary 202.

FIG. 3 is a block diagram illustrating an example system 300 including a fraud detection engine 301, in accordance with at least one embodiment. User device(s) 302 may be one or more computing devices that may be used to interact with service provider computer(s) 304. For example, the user device(s) 302 may be any suitable type of computing device such as, but not limited to, a mobile phone, a touch screen device, a smartphone, a personal digital assistant (PDA), a laptop computer, a desktop computer, a tablet PC, or the like. In some examples, the user device(s) 302 may be in communication with the service provider computer(s) 304 via the networks 306. For example, the user device(s) 302 may be used to access a user interface accessible through an application 308 (e.g., a web browser, an application configured to render user interfaces provided by the service provider computer(s) 304) running on the user device(s) 302 via one or more networks 306. As a non-limiting example, service provider computer(s) 304 may host a banking website that may be accessible via application 308. A user may utilize one of user device(s) 302 to access user interfaces provided via the application 308 to provide account data. The account data (e.g., email address, physical address, first name, last name, phone number, social security number, and the like) may be transmitted to the service provider computer(s) 304 via network(s) 306. In some embodiments, the account data may be received in a request to open a new account. The network(s) 306 may include any one or a combination of many different types of networks, such as cable networks, the Internet, wireless networks, cellular networks, and other private and/or public networks.

The user device(s) 302 and service provider computer(s) 304 may individually include memory (e.g., memory 310 and memory 312, respectively). The memory 310 and 312 may store computer-executable instructions that are loadable and executable by the processor(s) of the respective devices. For example, memory 310 may store instructions that are loadable and executable by the processor(s) 314, while memory 312 may store instructions that are loadable and executable by the processor(s) 316. Memory 310 and/or 312 may additionally store data generated during the execution of these programs. The memory 310 and/or 312 may be volatile (such as RAM) and/or non-volatile (such as ROM, flash memory, etc.). The user device(s) 302 and/or the service provider computer(s) 304) may include additional storage (e.g., storage 318 and storage 320, respectively), which may include removable storage and/or non-removable storage. Storage 318 and/or storage 320 may include, but is not limited to, magnetic storage, optical disks and/or tape storage. The disk drives and their associated computer-readable media may provide non-volatile storage of computer-readable instructions, data structures, program modules, and other data for the computing devices.

The memory 310, the memory 312, the storage 318, and/or the storage 320 may each be an example of computer-readable storage media. Computer-readable storage media may include volatile, or non-volatile, removable, or non-removable media implemented in any method or technology for storage of information such as computer-readable instructions, data structures, program modules, or other data. In some embodiments, memory 310, memory 312, storage 318, and/or storage 320 are examples of computer storage media. Memory 310, memory 312, storage 318, and/or storage 320 may include, but are not limited to, any suitable combination of PRAM, SRAM, DRAM, RAM, ROM, EEPROM, flash memory or other memory technology, CD-ROM, DVD, magnetic tape, magnetic disk storage or other magnetic storage devices, or any other medium which can be used to store desired information, and which can be accessed by the computing device on which memory 310, memory 312, storage 318, and/or storage 320 resides. Computer-readable media may include computer-readable instructions, program modules, or other data transmitted within a data signal, such as a carrier wave, or other transmission. However, as used herein, computer-readable storage media does not include computer-readable communication media.

The memory 310 and the memory 312 may individually include an operating system (e.g., operating system 322 and operating system 324, respectively) and one or more data stores (e.g., data store 326 and data store 328, respectively), and/or one or more application programs, modules, or services. The user device(s) 302 may contain communications connection(s) 330 that allow the user device(s) 302 to communicate with a stored database, another computing device (e.g., the service provider computer(s) 304), a server, user terminals and/or other devices. The user device(s) 302 may include I/O device(s) 332, such as a keyboard, a mouse, a pen, a voice input device, a touch input device, a display, speakers, a printer, etc. Similarly, the service provider computer(s) 304 may contain communications connection(s) 334 that allow the service provider computer(s) 304 to communicate with a stored database, another computing device (e.g., the user device(s) 302), a server, user terminals and/or other devices. The service provider computer(s) 304 may include I/O device(s) 336, such as a keyboard, a mouse, a pen, a voice input device, a touch input device, a display, speakers, a printer, etc.

In some embodiments, the memory 312 may store instructions that, when executed by processor(s) 316 implement the functionality described herein with respect to the fraud detection engine 301 (e.g., the Fraud Detection System 102 of FIG. 1) to provide the functionality described herein.

Figure 4:
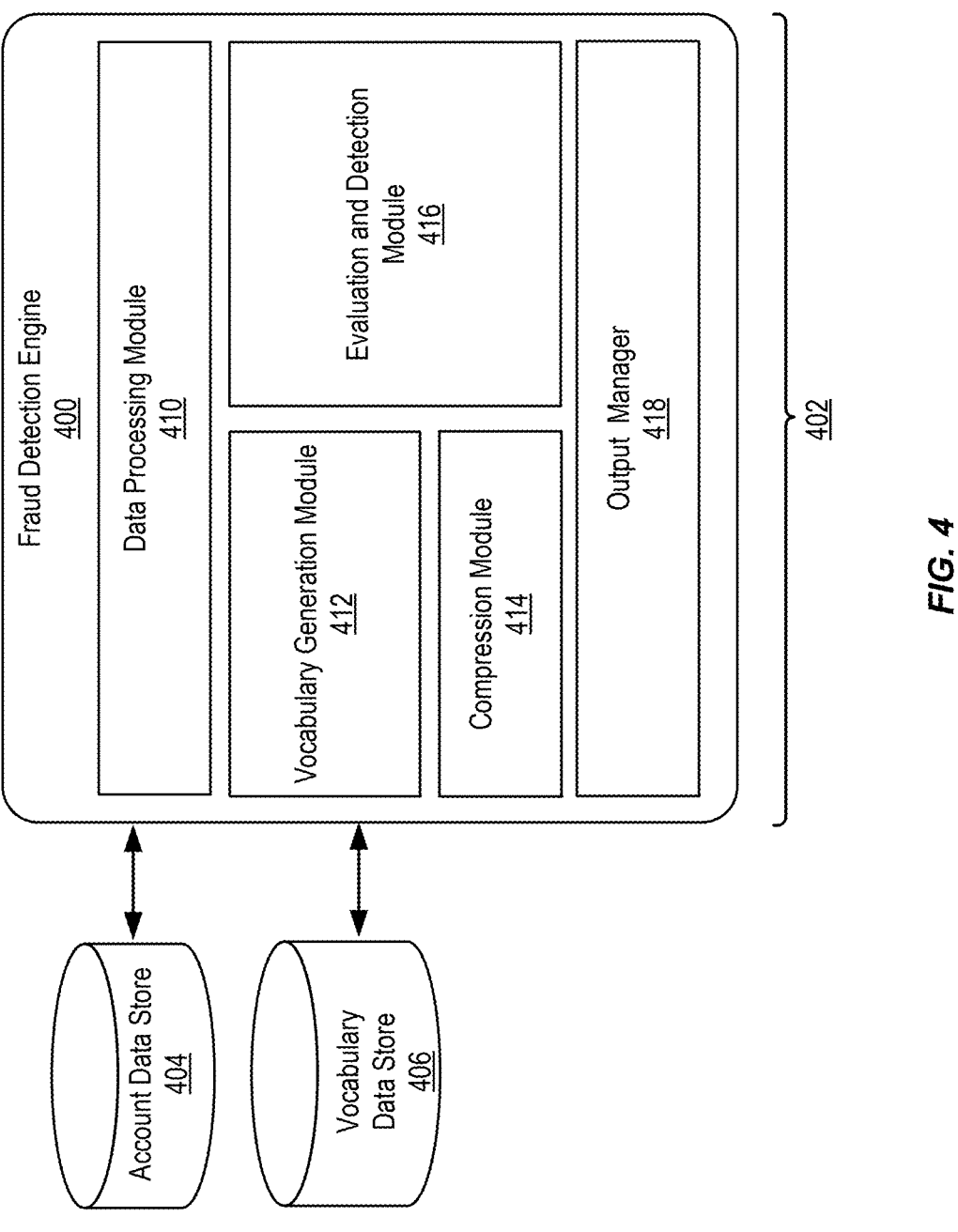
FIG. 4 is a schematic diagram of an example computer architecture for the fraud detection engine, including a plurality of modules that may perform functions in accordance with at least one embodiment.

FIG. 4 is a schematic diagram of an example computer architecture for the fraud detection engine 400, including a plurality of modules that may perform functions in accordance with at least one embodiment. The modules 402 may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for providing functionality corresponding to the module described below. The modules 402 may be executed by the service provider computer(s) 304 of FIG. 3, or the modules 402 may exist as separate modules or services external to the service provider computer(s) 304. In some embodiments, the modules 402 may be executed by the same or different computing devices (e.g., service provider computer(s) 310 of FIG. 3), as a service, as an application, or the like.

In the embodiment shown in the FIG. 4, data stores such as account data store 404 and vocabulary data store 406 are shown, although data can be maintained, derived, or otherwise accessed from various data stores, either remote or local to the fraud detection engine 400, to achieve the functions described herein. The fraud detection engine 400, as shown in FIG. 4, includes various modules such as a data processing module 410, vocabulary generation module 412, compression module 414, evaluation and detection module 416, and output manager 418. Some functions of the modules 410, 412, 414, 416, and 418 are described below. However, for the benefit of the reader, a brief, non-limiting description of each of the modules is provided in the following paragraphs.

The data processing module 410 may be configured to receive any suitable data to be processed by the fraud detection engine 400. By way of example, the data processing module 410 may be configured to receive a variety of requests (e.g., a request to generate a vocabulary, a request for a new account, etc.). In some embodiments, the data processing module 410 may be configured to invoke any suitable combination of the modules 412-418 at any suitable time. By way of example, the data processing module 410 may invoke the functionality of the vocabulary generation module 412 in response to receiving a request to generate a vocabulary. In some embodiments, the data processing module 410 may be configured to invoke the functionality of the vocabulary generation module 412 according to a predefined frequency or schedule, the parameters of which may be provided in a request to generate a vocabulary. The request to generate the vocabulary may specify a portion of the account data stored in account data store 404. In some embodiments, account data store 404 may store any suitable number of account data instances corresponding to any suitable number of accounts which have previously been identified as being legitimate. In some embodiments, the data processing module 410 may be configured to invoke the functionality of the compression module 414 and/or the evaluation and detection module 416 in response to receiving a request to create a new account.

Vocabulary generation module 412 may include any suitable number of programs, algorithms, computer readable instructions, that, when executed, generate one or more vocabularies (e.g., vocabulary 202 of FIG. 2, vocabulary 105 of FIG. 1, etc.) from any suitable portion of account data store 404 (e.g., a set of legitimate account data instances). In some embodiments, generating the vocabularies may utilize any suitable compression algorithm including, but not limited to, byte pair encoding algorithms, WordPiece algorithms, SentencePiece algorithms, or any suitable text and/or character based tokenization algorithms that may be used to identify tokens for which replacement values may be identified. In some embodiments, the vocabulary generation module 412 may be configured to obtain any suitable portion of account data 430 (e.g., all email addresses, all physical addresses, all first names, all last names, etc., or any suitable combination thereof). In some embodiments, a vocabulary may be generated using any suitable number and combination of account data attributes corresponding to any suitable number of legitimate accounts and in accordance with the process described above in connection to FIG. 2. The vocabulary generation module 412 may be configured to store the vocabulary in the vocabulary data store 406. The vocabulary generation module 412 may be configured to periodically update a vocabularies stored in vocabulary data store 406 at any suitable time or according to any suitable schedule, predefined frequency, or on demand.

Although examples provided herein include generating vocabularies from account data corresponding to legitimate accounts, it should be appreciated that similar techniques may be used to generate a vocabulary from account data corresponding to accounts that have been previously identified as fraudulent accounts. In these cases, the account data store 404 may include the previously-identified fraudulent account data, and the vocabulary generation module 412 may generate vocabularies from fraudulent account data in a similar manner as described above in connection with FIG. 2.

Compression module 414 may include any suitable number of programs, algorithms, computer readable instructions, that, when executed, may be configured to apply one or more compression algorithms to data provided as input. As a non-limiting example, account data received in a request for creation of a new account may be passed to the compression module 414. Compression module 414 may be configured to obtain the vocabulary to be utilized from vocabulary data store 206. Using the vocabulary, the compression module 414 may identify tokens with any suitable portion of the account data and replace the tokens with the respective replacement values identified in the vocabulary. In some embodiments, the compression module 414 may be configured to invoke the functionality of the evaluation and detection module 416. Invoking the functionality of the evaluation and detection moule 416 may include providing the original account data and the compressed account data.

Evaluation and detection module 416 may include any suitable number of programs, algorithms, computer readable instructions, that, when executed, may be configured to receive uncompressed account data from account data 430 and/or the compressed account data from the compression module 414. In some examples, the evaluation and detection module 416 may be configured to compute an amount by which the account data was compressed based at least in part on a length (e.g., in number of alphanumeric characters) of the uncompressed account data and the length of the compressed account data. By way of example, the evaluation and detection module 416 may divide the length of the compressed account data by the length of the uncompressed account data to indicate a relative length of the compressed account data with respect to the uncompressed account data. As a non-limiting example, when the uncompressed account data is 20 characters long and the compressed account data is 4 characters long, the relative length of the compressed data is 20% of the length of the uncompressed data (or $\frac{1}{5}^{th}$ of the length of the uncompressed data). In some embodiments, the relative length of the compressed data may be used to determine whether the account data is fraudulent. In some embodiments, the evaluation and detection module 416 may be configured to utilize a predefined threshold to determine whether the account data is fraudulent. For example, the predefined threshold may indicate that at least a 50% compression needs to occur for account data to be deemed legitimate. If the length of the compressed account data when compared to the length of the uncompressed account data (referred to herein as the "relative length" of the compressed account data) does not indicate that at least the amount of compression indicated by the predefined threshold has occurred (e.g., that the relative length of the compressed account data is less than 50% or that the computed amount of compression is greater than 50% of the length of the uncompressed account data) then the evaluation and detection module 416 may be configured to determine that the account data is fraudulent. Alternatively, if at least the amount of compression indicated by the predefined threshold has occurred, the evaluation and detection module 416 may determine that the account data is legitimate. It should be appreciated that any suitable measurement of data compression may be utilized as well as any suitable threshold. For example, in some embodiments, account data may be deemed fraudulent when fewer than a threshold number of tokens (e.g., 3, 5, 6, etc.) are used from the vocabulary to replace portions of the account data during compression.

As described above, the vocabulary may be generated from fraudulent account data. In these examples, the evaluation and detection module 416 may be configured to identify the new account data as fraudulent based at least in part on a number of tokens of the vocabulary used as replacement values during compression and/or a relative length of the compressed account data with respect to the uncompressed account data. That is when the length of the compressed account data is less than 50% of the length of the uncompressed account data, where 50% is a predefined threshold, the account data may be deemed fraudulent. Alternatively, when the length of the compressed account data is greater than 50% of the length of the uncompressed account data, the account data may be deemed legitimate.

In some embodiments, the evaluation and detection module 416 may invoke the functionality of the output manager 418 at any suitable time. In some embodiments, invoking the functionality of the output manager 418 may include providing the output manager 418 the uncompressed and compressed account data, the original request received by the data processing module 410, a determination that the account data is fraudulent or legitimate, or the like.

Output manager 418 may include any suitable number of programs, algorithms, computer readable instructions, that, when executed, may be configured to control, interact, provide feedback, provide alerts, provide notifications, and/or operations in response to the evaluation and detection module 416 determining that the account data is fraudulent or legitimate. The output manager 418 may include functionality to communicate with one or more user devices (e.g., via communication connections 330 of FIG. 3). The operations may include transmitting one or more notifications to one or more user devices (e.g., system administrator, smart phone, etc.) that indicates that the account data has been determined to be fraudulent. In some embodiments, the operations performed by the output manager 418 may include storing the fraudulent account data for subsequent use such as for reporting purposes or any suitable purpose.

In some embodiments, the output manager 418 may be configured to deny a request to open a user account based at least in part on a determination that the account data associated with the request is determined to be fraudulent or allow the request when the account data associated with the request is determined to be legitimate. The output manager 418 may be configured to store, retrieve, or transmit such data according to a predetermined periodicity, schedule (e.g., every hour, every day, etc.), frequency, or by request (e.g., user request).

Figure 5:
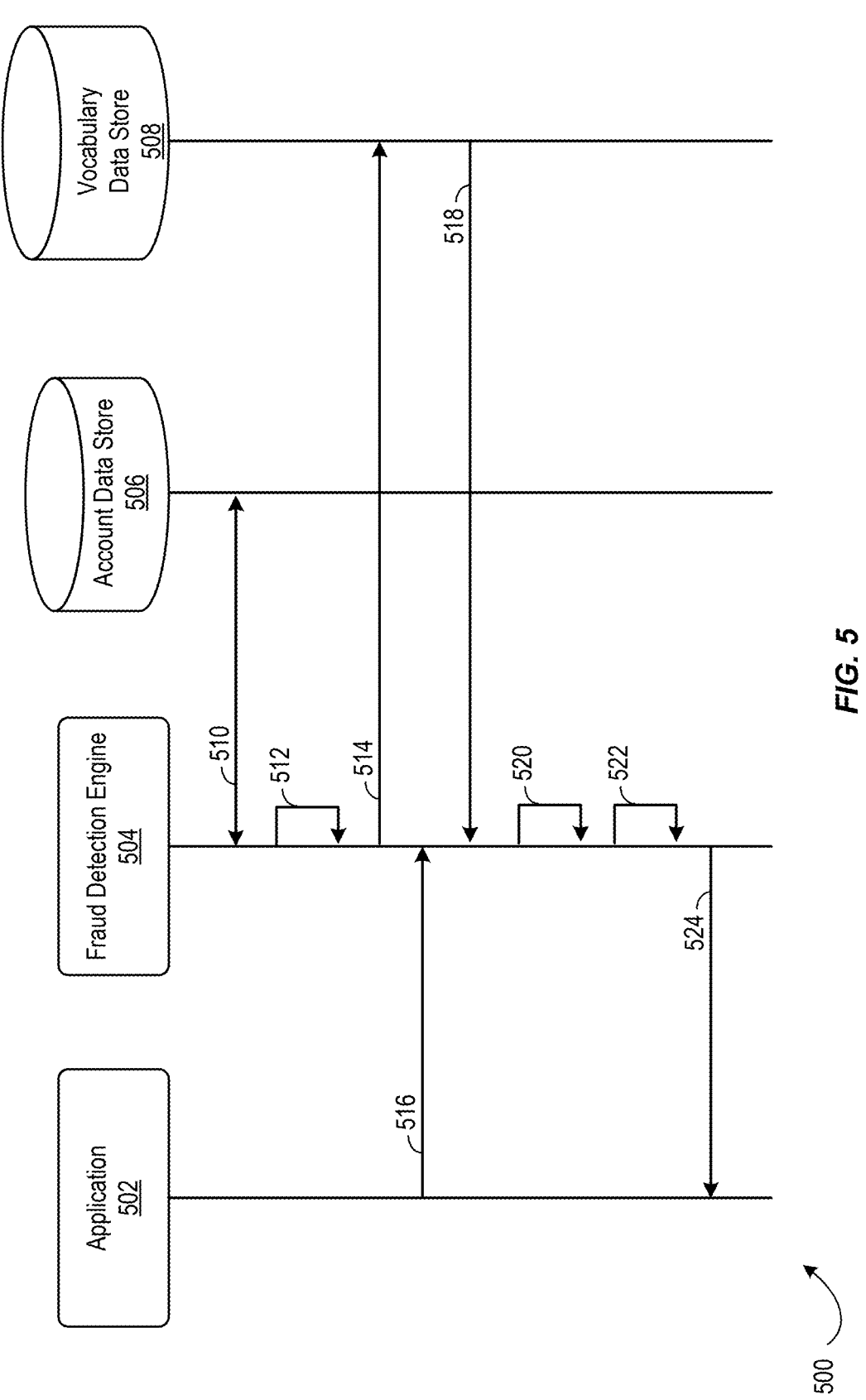
FIG. 5 is a swim diagram illustrating example component interactions performed as part of detecting fraudulent account data, in accordance with at least one embodiment.

FIG. 5 is a swim diagram 500 illustrating example component interactions performed as part of detecting fraudulent account data, in accordance with at least one embodiment. The interactions may occur between components including application 502 (e.g., application 308 of FIG. 3), fraud detection engine 504 (e.g., fraud detection engine 400 of FIG. 4, fraud detection engine 301 of FIG. 3, etc.), account data store 506 (e.g., account data store 404 of FIG. 4), and vocabulary data store 508 (e.g., vocabulary data store 406 of FIG. 4). The operations performed by the components of FIG. 5 may be combined or separated in any suitable manner. Therefore, more or fewer components than those depicted in FIG. 5 may be used.

At 510, a fraud detection engine 504 (e.g., fraud detection engine 400 of FIG. 4) may be configured to retrieve some, or all, legitimate account data instances (e.g., legitimate email addresses, login credentials, names, physical addresses, etc.) from account data store 506. Alternatively, in some embodiments, fraudulent account instances may be stored in account data store 506 and obtained by the fraud detection engine 504 at 510.

At step 512, the fraud detection engine 504 may generate a data compression vocabulary (e.g., vocabulary 105 of FIG. 1, vocabulary 202 of FIG. 2, etc.) based on the account data instances obtained at 510. In some embodiments, the process for generating a vocabulary as described above in connection with FIG. 2 may be performed at 512. In some embodiments, the fraud detection engine 504 may be configured to generate multiple vocabularies based on different sets of account data fields. By way of example, one vocabulary may be generated from only email addresses of legitimate accounts, while another vocabulary may be generated using all the email addresses and physical addresses of the legitimate accounts. Any suitable number or combination of account data fields may be used to generate a vocabulary.

At step 514, the fraud detection engine 504 may be configured to store the data compression vocabulary/vocabularies in a data store such as vocabulary data store 508 for future retrieval, comparisons, updates, or combinations thereof.

At step 516, the fraud detection engine 504 may be configured to receive, from application 502 (e.g., application 308 in FIG. 3), a request to open an account. The request to open the account may include any suitable account data (e.g., email address, login credentials, etc.). The request may be sent from a user device (e.g., user device(s) 302 of FIG. 3) on which application 502 executes.

At step 518, the fraud detection engine 504 may be configured to obtain the vocabulary generated at 512 from the vocabulary data store 508. In some examples, the fraud detection engine 504 may obtain vocabulary for a specific type/combination of account data (e.g., the vocabulary generated using only email addresses).

At step 520, the fraud detection engine 504 may be configured to use the data compression vocabulary to compress the account data received in the request to open the account. For example, the fraud detection engine 504 may substitute respective replacement values for each token identified in the account data that is also identified in the vocabulary to create a compressed respective replacement value.

At step 522, the fraud detection engine 504 may be configured to compare a length of the compressed data to the initial length of the account data. If the length of the compressed data does not breach a threshold compared to the initial length of the account data (e.g., the length of the compressed data is not at least 75% less than the length of the uncompressed account data), then the fraud detection engine 504 may determine that the account data is fraudulent. Otherwise, the fraud detection engine 504 may determine that the account data is legitimate. The fraud detection engine 504 may be configured to perform one or more operations in response to determining that the account data is fraudulent or legitimate. The operations performed when the account data is fraudulent may differ than those performed when the account data is deemed legitimate. An example of these operations may include denying the request when the account data is fraudulent or approving the request when the account data is legitimate.

At step 524, the fraud detection engine 504 may be configured to provide a response to the request. For example, the fraud detection engine 504 may provide a response indicating the request was denied when the account data is determined to be fraudulent or a response indicating the request was approved when the account data is determined to be legitimate.

It should be appreciated that the operations depicted in FIG. 5 may be performed in any suitable order, not necessarily the order depicted in FIG. 5 Further, additional or fewer operations may be performed than those depicted in FIG. 5.

FIG. 6 is a block diagram illustrating an example method 600 for detecting fraudulent account data, in accordance with at least one embodiment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 600 may include additional, or fewer operations than those depicted in FIG. 6. The operations of method 600 may be performed by any suitable portion of the service provider computer(s) 304 of FIG. 3 such as by the fraud detection engine 301 of FIG. 3.

The method 600 may begin at 602, a data compression vocabulary may be generated (e.g., by the vocabulary generation module 412 of FIG. 4) from legitimate account data instances (e.g., account data corresponding to legitimate accounts and obtained from account data store 404 of FIG. 4). In some examples, the data compression vocabulary may specify one or more tokens identified from the legitimate account data instances. The one or more tokens may be individually associated with a corresponding replacement value. In some embodiments, data compression vocabulary may be previously generated and simply retrieved by the computing device from a data store (e.g., vocabulary data store 406 of FIG. 4).

At step 604, the computing device may be configured to receive (e.g., from account data 404 of FIG. 4 and/or from user device(s) 302 of FIG. 3) account data corresponding to a user account. The account data may have an initial length (e.g., a number of characters, letters, symbols, numbers, etc.). In some examples, the account data may be initially received in a request to open a new account. In some embodiments, the received account data may be initially stored and processed for fraud detection as described at 606-610 at a suitable time. In some embodiments, the operations described at 606-610 may be performed during a time at which the requested account does not exist.

At step 606, compressed account data may be generated (e.g., by compression module 414 of FIG. 4) based at least in part on replacing a token identified in the account data with a respective replacement value from the data compression vocabulary.

At step 608, the account data may be determined (e.g., by the evaluation and detection engine 416 of FIG. 4) to be fraudulent based at least in part on the initial length of the account data and a resultant length of the compressed account. For example, when the compressed account data is determined to be at least half as long as the initial length of the account data (when a predefined threshold is set to 50%), the account data may be determined to be fraudulent.

At step 610, one or more operations may be performed (e.g., by output manager 418 of FIG. 4) based at least in part on determining that the account data is fraudulent. In some examples, the operations may include transmitting a notification to one or more user devices (e.g., user device(s) 302 of FIG. 3) that indicates that the account data has been determined to be fraudulent. In some embodiments, operations may include denying a request to open a user account.

Although not depicted, the computing device may perform a different set of operations based at least in part on determining that the account data is legitimate. For example, the fraud detection engine may accept the request to open the user account. Account data that has been determined to be legitimate may be stored in account data store 404 of FIG. 4 and a new vocabulary may be generated (or the previous vocabulary updated) using the newly stored account data at any suitable time.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system can include a number of workstations running any of a variety of commercially available operating systems and other known applications for purposes such as development and database management. These devices can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may include one or more storage devices, such as disk drives, optical storage devices, and solid-state storage devices such as random-access memory ("RAM") or read-only memory ("ROM"), as well as removable media devices, memory cards, flash cards, etc.

Such devices can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices typically will include a number of software applications, modules, services, or other elements located within at least one working memory device, including an operating system and application programs, such as a client application or Web browser. It should be appreciated that alternate embodiments may have numerous variations from that described above. For example, customized hardware might be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about" or "substantially", "similar to", "similar", "approximately" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two stated extents and/or including one of the two stated extents.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
generating, by a computing device from legitimate account data instances using byte pair encoding (BPE), a data compression vocabulary, the data compression vocabulary developed with the BPE and specifying a plurality of tokens identified from the legitimate account data instances, each token of the plurality of tokens being individually associated with a corresponding replacement value, wherein the BPE is tailored to a format and structure of the account data;
executing, by the computing device, an online account creation process comprising:
receiving, by the computing device via a network, an account creation request to generate a user account, the account creation request comprising account data having an initial length measured in bytes or characters;
applying, by the computing device, the data compression vocabulary to compress the account data and generate compressed account data based at least in part on replacing a token identified in the account data with a respective replacement value from the data compression vocabulary;
determining, by the computing device through automated compression analysis, whether the account data is fraudulent based at least in part on: (i) calculating a compression ratio metric and a predefined threshold value, wherein the compression ratio metric is based at least in part on a difference between the initial length of the account data and a resultant length of the compressed account data measured in bytes or characters; and (ii) comparing the compression ratio metric to a predefined threshold, the predefined threshold value being determined based on historical compression ratios of legitimate account data and dynamically adjusted in real-time based on updated compression ratios of newly validated legitimate account data;

in response to determining that the account creation request is fraudulent according to the automated compression analysis, executing, by the computing device, a first set of operations to:

deny the account creation request;

forgo execution of operations associated with generating the user account; and log the account creation request as a potential fraud incident in a fraud detection database, wherein the account creation request is determined to be fraudulent based on determining that the resultant length of the compressed account data as compared to the initial length of the account data fails to exceed the predefined threshold value; and in response to determining that the account creation request is legitimate according to the automated compression analysis, executing, by the computing device, a second set of operations for:

generating the user account using the account data;

updating the data compression vocabulary using the account data, wherein the updating comprises:

identifying new tokens in the account data not present in the data compression vocabulary;

adding the new tokens to the data compression vocabulary with replacement values derived from the BPE;

dynamically adjusting the predefined threshold value based on updated compression ratios of legitimate account data; and storing the updated data compression vocabulary in a data store.

2. The computer-implemented method of claim 1, wherein determining that the account data is fraudulent further comprises:

computing, by the computing device, an amount by which the account data was compressed based at least in part on the initial length of the account data and the resultant length of the compressed account data; and determining that the amount by which the account data was compressed exceeds a predefined threshold value.

3. The computer-implemented method of claim 1, wherein generating the data compression vocabulary utilizes a byte pair encoding algorithm.

4. The computer-implemented method of claim 1, wherein the account data comprises an email address.

5. The computer-implemented method of claim 1, wherein the legitimate account data instances are obtained from historical account data of a plurality of accounts that have been identified as being legitimate.

6. A computing device comprising:

one or more processors; and one or more memories storing computer-executable instructions that, when executed by the one or more processors, causes the one or more processors to:

generate, from legitimate account data instances using byte pair encoding (BPE), a data compression vocabulary, the data compression vocabulary developed with the BPE and specifying a plurality of tokens identified from the legitimate account data instances, each token of the plurality of tokens being individually associated with a corresponding replacement value, wherein the BPE is tailored to a format and structure of the account data;

during and as at least part of an online account creation process:

receive, via a network, an account creation request to generate a user account, the account creation request comprising account data having an initial length measured in bytes or characters;

applying, by the computing device, the data compression vocabulary to compress the account data and generate compressed account data based at least in part on replacing a token identified in the account data with a respective replacement value from the data compression vocabulary;

determine through automated compression analysis whether the account data is fraudulent based at least in part on: (i) calculating a compression ratio metric and a predefined threshold value, wherein the compression ratio metric is based at least in part on a difference between the initial length of the account data and a resultant length of the compressed account data measured in bytes or characters; and (ii) comparing the compression ratio metric to a predefined threshold, the predefined threshold value being determined based on historical compression ratios of legitimate account data and dynamically adjusted in real-time based on updated compression ratios of newly validated legitimate account data;

in response to determining that the account creation request is fraudulent according to the automated compression analysis, execute a first set of operations to:

deny the account creation request;

forgo execution of operations associated with generating the user account; and log the account creation request as a potential fraud incident in a fraud detection database, wherein the account creation request is determined to be fraudulent based on determining that the resultant length of the compressed account data as compared to the initial length of the account data fails to exceed the predefined threshold value; and in response to determining that the account creation request is legitimate according to the automated compression analysis, execute a second set of operations for:

generating the user account using the account data;

updating the data compression vocabulary using the account data, wherein the updating comprises:

identifying new tokens in the account data not present in the data compression vocabulary;

adding the new tokens to the data compression vocabulary with replacement values derived from the BPE;

dynamically adjusting the predefined threshold value based on updated compression ratios of legitimate account data; and storing the updated data compression vocabulary in a data store.

7. The computing device of claim 6, wherein executing the computer-executable instructions that determine whether the account data is fraudulent further causes the one or more processors to:

compute an amount by which the account data was compressed based at least in part on the initial length of the account data and the resultant length of the compressed account data; and determine that the amount by which the account data was compressed exceeds a predefined threshold value.

8. The computing device of claim 6, wherein generating the data compression vocabulary utilizes a byte pair encoding algorithm.

9. The computing device of claim 6, wherein the account data comprises an email address.

10. The computing device of claim 6, wherein the legitimate account data instances are obtained from historical account data of a plurality of accounts that have been identified as being legitimate.

11. A non-transitory, computer-readable storage medium storing computer-executable instructions that, when executed with one or more processors of a computing device, causes the one or more processors to:

generate, from legitimate account data instances using byte pair encoding (BPE), a data compression vocabulary, the data compression vocabulary developed with the BPE and specifying a plurality of tokens identified from the legitimate account data instances, each token of the plurality of tokens being individually associated with a corresponding replacement value, wherein the BPE is tailored to a format and structure of the account data;

during and as at least part of an online account creation process:

receive, via a network, an account creation request to generate a user account, the account creation request comprising account data having an initial length measured in bytes or characters; and (ii) comparing the compression ratio metric to a predefined threshold, the predefined threshold value being determined based on historical compression ratios of legitimate account data and dynamically adjusted in real-time based on updated compression ratios of newly validated legitimate account data;

applying, by the computing device, the data compression vocabulary to compress the account data and generate compressed account data based at least in part on replacing a token identified in the account data with a respective replacement value from the data compression vocabulary;

determine through automated compression analysis whether the account data is fraudulent based at least in part on: (i) calculating a compression ratio metric and a predefined threshold value, wherein the compression ratio metric is based at least in part on a difference between the initial length of the account data and a resultant length of the compressed account data measured in bytes or characters;

in response to determining that the account creation request is fraudulent according to the automated compression analysis, execute a first set of operations to:

automatically deny the account creation request;

forgo execution of operations associated with generating the user account; and log the account creation request as a potential fraud incident in a fraud detection database, wherein the account creation request is determined to be fraudulent based on determining that the resultant length of the compressed account data as compared to the initial length of the account data fails to exceed the predefined threshold value; and in response to determining that the account creation request is legitimate according to the automated compression analysis, execute a second set of operations for:

generating the user account using the account data;

updating the data compression vocabulary using the account data, wherein the updating comprises:

identifying new tokens in the account data not present in the data compression vocabulary;

adding the new tokens to the data compression vocabulary with replacement values derived from the BPE;

dynamically adjusting the predefined threshold value based on updated compression ratios of legitimate account data; and storing the updated data compression vocabulary in a data store.

12. The non-transitory, computer-readable storage medium of claim 11, wherein executing the computer-executable instructions that determine whether the account data is fraudulent further causes the one or more processors to:

compute an amount by which the account data was compressed based at least in part on the initial length of the account data and the resultant length of the compressed account data; and determine that the amount by which the account data was compressed exceeds a predefined threshold value.

13. The non-transitory, computer-readable storage medium of claim 11, wherein generating the data compression vocabulary utilizes a byte pair encoding algorithm.

14. The non-transitory, computer-readable storage medium of claim 11, wherein the legitimate account data instances are obtained from historical account data of a plurality of accounts that have been identified as being legitimate.

15. The computer-implemented method of claim 1, wherein automatically denying the account creation request comprises forgoing storage of the account data in memory, and wherein generating the user account using the account data comprises storing the account data in the memory.

16. The computer-implemented method of claim 1, wherein the predefined threshold value represents a percentage by which the account data must be compressed using the data compression vocabulary for the account data to be determined to be legitimate.

17. The computing device of claim 6, wherein executing the computer-executable instructions that deny the account creation request further cause the one or more processors to forgo storage of the account data in memory, and wherein executing the computer-executable instructions that generate the user account using the account data further cause the one or more processors to store the account data in the memory.

18. The computing device of claim 6, wherein the predefined threshold value represents a percentage by which the account data must be compressed using the data compression vocabulary for the account data to be determined to be legitimate.

19. The non-transitory, computer-readable storage medium of claim 11, wherein executing the computer-executable instructions that deny the account creation request further cause the one or more processors to forgo storage of the account data in memory, and wherein executing the computer-executable instructions that generate the user account using the account data further cause the one or more processors to store the account data in the memory.

20. The non-transitory, computer-readable storage medium of claim 11, wherein the predefined threshold value represents a percentage by which the account data must be compressed using the data compression vocabulary for the account data to be determined to be legitimate.

\* \* \* \* \*